2,696,502

REACTION PRODUCT OF PERCHLOROMETHYL MERCAPTAN AND STYRENE

William P. ter Horst, Lewiston, N. Y., assignor to Olin Mathieson Chemical Corporation, a corporation of Virginia No Drawing. Application January 8, 1952,
Serial No. 265,537

1 Claim. (Cl. 260—543)

This invention relates to a new composition of matter which represents the reaction product of styrene, $C_6H_5CH:CH_2$, and perchloromethyl mercaptan, $CSCl_4$, which has value as a fungicide and miticide.

My novel composition of matter is obtained by heating styrene in benzene solution with perchloromethyl mercaptan and benzoyl peroxide.

I have discovered that the reaction product of styrene and perchloromethyl mercaptan possesses a high degree of activity against a wide variety of fungi and mites. My new composition of matter may be utilized, for example, to control the activity of fungi and mites on plant life by applying to the plant a composition comprising the reaction product of styrene and perchloromethyl mercaptan in very dilute concentrations. The balance of the composition is composed of a pesticidal base material which may be pesticidally active or inactive, e. g. elemental sulfur, inert clays, water, hydrocarbons or other common carriers and dispersants. In general my new composition may be applied by spraying or dusting. However, a particularly advantageous form of application of my novel composition to plant surfaces as a fungicide or miticide is as a liquid compounded with conventional diluents or other active ingredients to form solutions, emulsions, or aerosols. My new composition may be dissolved in refined benzene, kerosene, toluene, xylene, alone or in mixtures with themselves or other materials such as acetone and alcohol. Such a solution may be sprayed directly on the plants or it may be diluted with water to form an emulsion. If employed as an emulsion a surface active agent may be added with advantage.

The preparation and pesticidal activity of my new composition will be further illustrated by reference to the following examples.

Example I

The composition was prepared by heating styrene in benzene solution with perchloromethyl mercaptan and benzoyl peroxide. 48.1 grams (0.463 mole) of styrene was freed of inhibitor by passing through a 12″ column of activated alumina. It was mixed with 86.1 grams (0.463 mole of $CSCl_4$, 100 ml. of benzene and 2 grams of benzoyl peroxide and heated at 80–90° C. for five hours. 1 gram of additional benzoyl peroxide was introduced and the heating continued for two hours. The mixture was steam distilled and the organic layer was filtered through anhydrous sodium sulfate which was washed with benzene. The product after evaporation of the benzene was a liquid heavier than water and soluble in chloroform and mineral oils. It contained 40.7% chlorine and 10.7% sulfur whereas the theoretical requirement for a monomolecular addition product is 48.9% chlorine and 11.0% sulfur.

Example II

The reaction product of styrene and perchloromethyl mercaptan was tested for inhibition of spore germination of treated spores of the plant pathogen, *Monilinia fructicola*, a measure of its effectiveness against fungi. The test was conducted by incubating various dilutions of spores and of the component to be tested in a nutrient medium for twenty-four hours at 20° C. The amount of inhibition is calculated from a count of the spores in the various test and control dilutions and is expressed as the ED–50 dose, i. e., the minimum dose in parts per million resulting in 50% inhibition of germination. The ED–50 dose for my new composition of matter was 20 p. p. m. indicating that very low dilutions of the compound are effective in preventing spore germination and achieving excellent fungicidal results.

Example III

The reaction product of styrene and perchloromethyl mercaptan was then tested for miticidal activity by testing for its contact effects (by direct dipping) on a plant-sucking pest, the two-spotted spider mite, *Tetranychus bimaculatus*. Mite infested young bean plants as well as uninfested bean plants were immersed in a 1% dispersion of the chemical to be tested. After drying, the bean plants were supported and their stems immersed in water filled bottles. The mortality against the two-spotted spider mite by the contact method of determination was 100%.

I claim:

As a new composition of matter, the reaction product of styrene and perchloromethyl mercaptan produced by heating styrene in benzene solution with perchloromethyl mercaptan in approximately equimolar amounts in the presence of benzoyl peroxide at a temperature in the range of about 80° C. to about 90° C., and recovering the reaction product from the reaction mixture.

References Cited in the file of this patent

UNITED STATES PATENTS

| Number    | Name     | Date           |
|-----------|----------|----------------|
| 2,051,807 | Allen    | Aug. 25, 1936  |
| 2,402,685 | Signaigo | June 25, 1946  |
| 2,454,108 | Walling  | Nov. 16, 1948  |
| 2,569,122 | Adelson  | Sept. 25, 1951 |
| 2,573,953 | Buckman  | Nov. 6, 1951   |

OTHER REFERENCES

Chem. Abs., vol. 40, August 20, 1946, page 48393.